United States Patent [19]
Pedersen et al.

[11] Patent Number: 6,033,702
[45] Date of Patent: Mar. 7, 2000

[54] METHOD AND APPARATUS FOR APPLYING DRYSTUFF PARTICLES ON ICE-CREAM ARTICLES

[75] Inventors: Ulrik Pedersen, Århus V; Ole Krener, Højbjerg, both of Denmark

[73] Assignee: Tetra Laval Food Hoyer A/S, Højbjerg, Denmark

[21] Appl. No.: 09/125,012

[22] PCT Filed: Aug. 10, 1997

[86] PCT No.: PCT/DK97/00059

§ 371 Date: Jan. 11, 1999

§ 102(e) Date: Jan. 11, 1999

[87] PCT Pub. No.: WO97/28697

PCT Pub. Date: Aug. 14, 1997

[30] Foreign Application Priority Data

Feb. 8, 1996 [DK] Denmark ............................ 0124/96

[51] Int. Cl.⁷ .................................................. A23G 9/24
[52] U.S. Cl. ............................ 426/289; 426/96; 426/100; 426/101; 425/91; 425/92; 425/93; 425/95; 425/96; 118/13; 118/26; 118/30; 118/308; 118/421; 118/423; 118/428
[58] Field of Search ........................ 426/289, 292, 426/96, 100, 101; 425/91, 92, 93, 95, 96; 118/13, 24, 26, 30, 308, 421, 423, 425, 428

[56] References Cited

U.S. PATENT DOCUMENTS

| 2,282,661 | 5/1942 | Lewis | 426/289 X |
| 2,642,029 | 6/1953 | Campbell | 118/30 |
| 2,689,544 | 9/1954 | Habgood | 118/24 |
| 2,735,398 | 2/1956 | Orrell et al. | 118/421 X |
| 3,580,188 | 5/1971 | Lutsey | 425/91 |
| 3,640,243 | 2/1972 | Dill et al. | 118/24 |

FOREIGN PATENT DOCUMENTS 144671 5/1982 Denmark .

*Primary Examiner*—Milton Cano
*Attorney, Agent, or Firm*—Sixbey, Friedman, Leedom & Ferguson; David S. Safran

[57] ABSTRACT

A coating of drystuff particles on the outside of an ice dome projecting from a cone is effected by pressing down the inversed cone against a spherical resilient membrane having a overlying layer of a particulate material. The invention proposes to coat the domes projecting further from the cone with the use of compressed air for pressing the membrane against the dome surface and by arranging for a vertical movement of the membrane relative to the overlying layer of the particle material.

7 Claims, 1 Drawing Sheet

METHOD AND APPARATUS FOR APPLYING DRYSTUFF PARTICLES ON ICE-CREAM ARTICLES

The present invention relates to a method of applying drystuff particles, e.g. chocolate or nut pieces, on ice-cream bodies, particularly on ice domes projecting from cones and optionally coated with a still semi soft layer of chocolate. It has been found that for a good fixation of the drystuff it is required to actively press it into the carrying surface, and for achieving an even distribution on the domed surface a suitable technique has already been developed, based on a principle of pressing down the domed surface against a layer of the drystuff particles on a resiliently yielding support, such that the latter can curve itself a distance upwardly along the downwardly facing ice dome top face and thereby act to press in the drystuff over a larger area.

In order to make this area still larger it has been proposed to design the resilient support as a half ball shaped membrane upstanding from a rigid bottom portion and approximately mating the size of the ice dome. The bottom portion forms the bottom of an open box that is filled with drystuff to a level slightly above the top of the said half ball or balls. When an ice dome is dipped into such a half ball, the latter may be deformed widely and slip upwardly along the dome during a progressing rolling in of drystuff thereagainst, exerting a suitable, slight pressure against the entire downwardly facing part of the dome irrespective of the relatively long depression depth thereof.

If the dome is considered as a ball it is hereby possible to effectively effect a drystuff coating almost up to the middle of this ball just by a rapid dipping thereof.

The present invention has as its starting point a desire of coating the ice dome with drystuff also above the said 'middle of the ball', e.g. all the way up to the edge of the supporting cone. The said half balls might well be modified for enabling a further depression of the ice domes, but this would not provide for the desired result, as there may not or must not occur a resilient constriction of the resilient membrane above the middle of the ball or the corresponding great circle of the dome. Moreover, such a further depressing would show the drawback that the entire dome should have to be dipped to a position underneath the said bottom plate, i.e. corresponding to a total dipping over two 'ball diameters'; this, per se, could be acceptable, but it would imply that a large part of the cone should be dipped below the surface of the drystuff in the said box, whereby there are bad conditions for holding the cone by gripping means that are not wanted to get in touch with the drystuff.

Thus, the said known technique is directly unsuited for fulfilling the purpose of the invention, but it has been recognized that in fact it is usable anyway, with a couple of essential modifications:

1) While it is hardly possible to embody a prolonged 'half ball' in such a way that the membrane material may contract resiliently above the said great circle, it is nevertheless possible to provide such a constriction by an introduction of a pressure medium at the lower or outer side of the membrane. Such a pressure will reveal itself all over the membrane, i.e. also on its bottom and side portions in its deformed condition, and when it is desired to use the possibility of pressurizing the membrane inwardly/downwardly above the great circle of the ice dome by means of a lower pressure medium, then the resilient properties of the half ball should be adapted to the condition that a corresponding pressure will be applied at the bottom and the downwardly facing surface portions of the ice cone, whereby the natural resilient pressure of the membrane may be correspondingly reduced. In return, it will then be possible for the membrane to also press the drystuff against the ice dome even in the constricted area above the horizontal great circle thereof and thus treat the dome in a reasonably uniform manner all over its surface. The membrane, of course, should be able to return into its starting position or shape when the pressure is relieved, as the treated product cannot otherwise be removed.

2) As far as the dipping depth is concerned it is important to note that the use of the said prolonged half ball according to the invention will accentuate the said problem with respect to the gripping of the carrying cone overhead the drystuff top side in the box. However, with the invention it has been realized that this associated problem can be effectively eliminated by the introduction of a new function, viz. by a relative, progressive raising of a local lower carrier portion for the prolonged half ball membrane relatively to the drystuff box during the lowering of the ice dome. By such an upward displacement of the half ball system, a rolling membrane function will occur, which can be controlled in such a manner that the top of the rolling membrane, during the entire dipping operation, will be situated slightly spaced beneath the top side of the drystuff in the box. This implies that the ice dome should be moved downwardly only by its own height dimension and not, as mentioned, twice the ball diameter. Thereby, practically the entire cone will be fully free to cooperate with relevant gripping means during the whole operation.

An alternative possibility will be that the entire drystuff box is raised during the dipping of the ice domes—or even with these maintained at a fixed level in connection with a raising of the entire drystuff box and a concurrent relative further raising of the supporting means of the prolonged half ball membranes.

For the carrying out of the method a well suited pressure medium will be pressurized air, the low viscosity of which will condition that the air underneath the flexible support portions can easily be displaced through valves or other elements in connection with the surrounding of the flexible support about the ice domes. Also, a uniform pressure on the underside of the flexible support can easily and rapidly be established by means of compressed air when the support is in its top position.

The top side of the flexible support can be made with a profilation operable to form distinct drystuff pattern on the surface of the ice dome.

In the following the invention is explained in more detail with reference to the drawing, in which:

BRIEF DESCRIPTION OF THE DRAWINGS

FIG. 1 shows an open box 2 with a rigid bottom 3 having a breakthrough for a vertically displaceable, cup shaped holding member 4 for a prolonged half ball membrane 6, which is mounted tightly sealed to the top opening of the member 4, such that a closed space 5 is confined between the membrane and the holding member 4. The membrane 6 is made of a thin and flexible material, advantageously of a thin rubber sheet.

The box 2 is filled with a drystuff 8 up to a level 10 slightly above the top of the membrane dome 6, and in the starting position the top side of the drystuff is smoothened so as to form an even layer.

Figures 1, 2, 3, 4, 5:
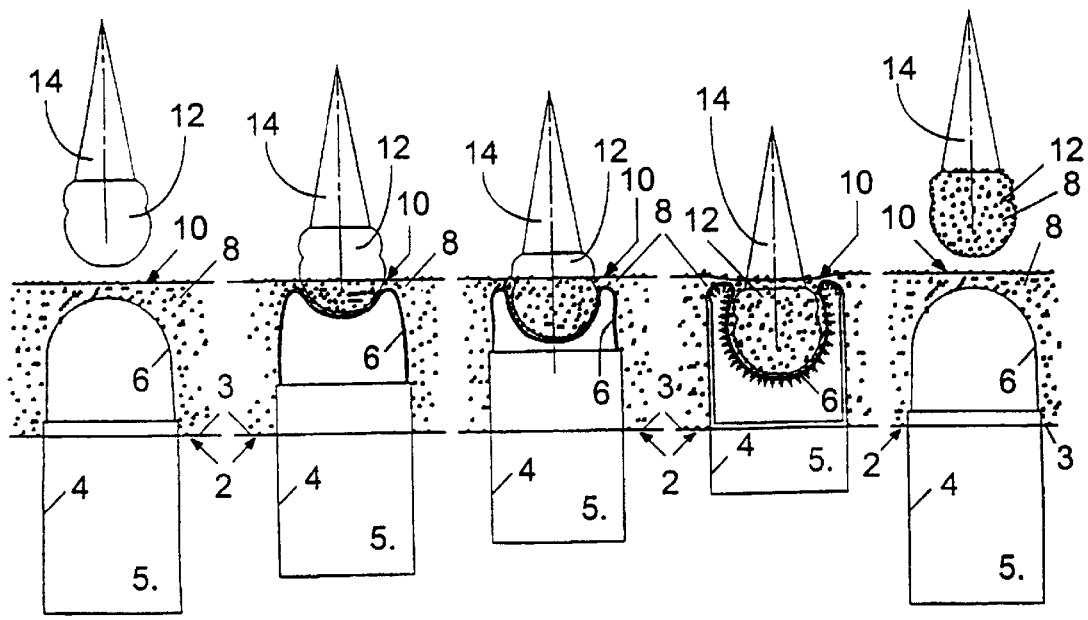
FIGS. 1–5 are sequential lateral views of an apparatus for applying drystuff onto an ice dome, illustrating the method according to the invention.

Above the membrane 6 and above the drystuff surface 10, FIG. 1 shows a freely hanging, dome shaped ice body 12 connected to a conical wafer 14 which is held by non-illustrated, but well known and height displaceable holding means.

In FIG. 2, the wafer cone 14 has been displaced downwardly to the extent that the dome shaped ice body 12 contacts the top of the membrane 6 and presses the same slightly downwardly, but at the same time the holding member 4 has been displaced upwardly in the box, such that the now bent-over, annular top edge of the membrane 6 is located in practically the same level underneath the drystuff top side as corresponding to the level of the top of the membrane in FIG. 1. The bent-over, annular top portion of the membrane has been rolled out over the convex portion of the dome 12 as a rolling membrane. By this rolling of the membrane the membrane wall, when passing thrugh the annular top edge, carries out a radially inwardly directed movement towards the ice body 12. This movement causes a transportation of the drystuff adjacent the membrane top edge inwardly against the surface of the surface of the ice body. A part of the drystuff, located in the area between the surface of the ice body and the annular edge of the membrane, will thus be drawn with the membrane and deposited in an even layer between the surfaces of the membrane and the ice body. In special cases, where the ruer membrane has a large surface, it may be desirable to maintain a certain overpressure inside the space 5 for preventing a membrane collaps and achieve that during the bringing together of the ice body 12 and the holding member 4 it is ensured that the membrane maintains a certain pressure against the ice body and that the membrane is rolled out evenly on the ice body.

In FIG. 3, the wafer cone 14 and the holding member 4 have been displaced further towards each other, such that the dome shaped ice body 12, surrounded by inserted drystuff 8, is covered by the rubber membrane 6 that has now been rolled onto the ice body up to the great circle thereof, while the annular top edge of this membrane 6 is still situated in practically the same level beneath the drystuff surface as the membrane top in FIG. 1.

In FIG. 4 the cone 14 is displaced to its bottom position and the holding member to its top position, such that the dome 12 is entirely surrounded by the drystuff and of the membrane. In this position the space 5 between the holding member 4 and the membrane 6 is connected with a source of pressurized air (not shown), whereby the membrane 6 is pressed tightly against the surface of the dome, indicated by small arrows, such that the drystuff between the dome surface and the membrane will be effectively pressed into the entire surface of the dome 12, also in the constricted area above the horizontal great circle thereof and up to adjacent the edge of the cone. The air pressure in the space 5 is maintained briefly, until the drystuff has been pressed into the dome surface.

The period of maintaining the air pressure in the space 5 depends of the rigidity of the ice, the character and layer thickness of the drystuff, and whether the drystuff should just adhere to the ice surface and project therefrom or be pressed entirely into the surface.

Thereafter the air pressure in the space 5 is reduced to ambient pressure so that it is then possible to move the cone with the drystuff coated ice dome to its top position and also to lower the holding member 4 to its bottom position. Under normal conditions the rubber membrane will automatically return to its dome shaped starting shape upon removal of the ice dome 12. In special cases this returning, however, may be supported by admission of compressed air into the space 5.

Thus, the bringing together of the holding member 4 with the membrane 6 and the cone 14 with is freely hanging ice dome 12 is effected in such a manner that the annular edge of the membrane is at least roughly maintained in the same level underneath the smoothened top side of the drystuff layer 10, see FIG. 2–4. This, in combination with the conveying of the drystuff over the annular membrane edge during the rolling out of the membrane over the ice dome 12, will ensure that there is constantly the required amount of drystuff ready for application of a uniform layer of the drystuff 8 between the membrane 6 and the surface of the ice dome.

Upon the returning of the rubber membrane 6 the drystuff layer is smoothened and refilled by means of a non-illustrated scraping and dosing system.

The discussed method and the associated apparatus for effecting the method will be usable for drystuff coating of ice products of many other shapes than the one illustrated. Thus, the method can also be used for drystuff coating of pinned ice bodies as well as bodies not having carrier elements such as cones or pins, but supported by means belonging to the apparatus.

Figure 6:
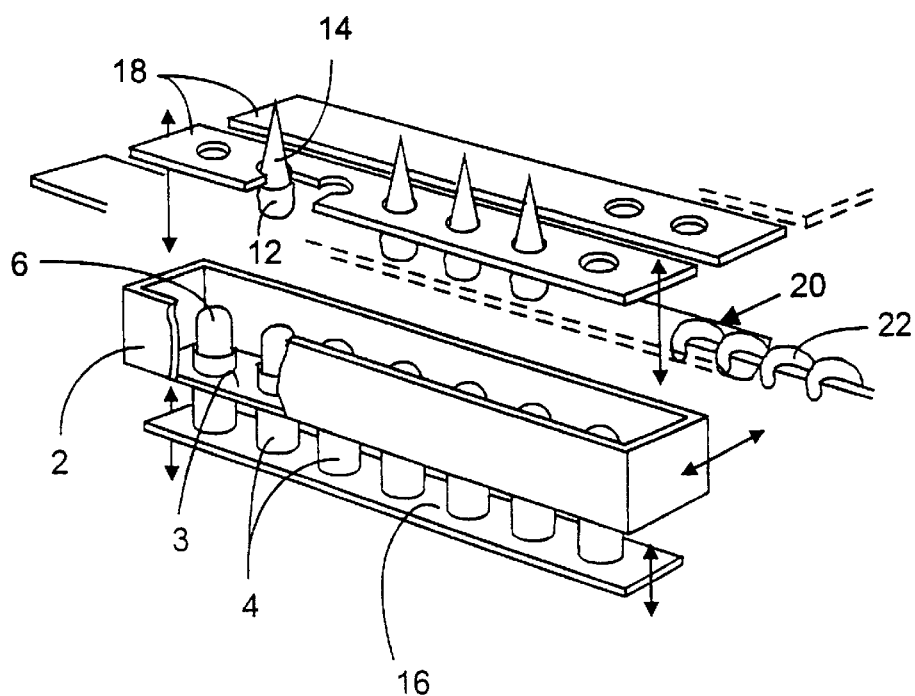
FIG. 6 is a schematic perspective view of an apparatus according to the invention.

The disclosed main parts will be refound in FIG. 6, where cup members 4 in a row of collectively operative applicator units 4,6 are mounted on a common support 16 connected with suitable raising and lowering means (not shown). Ice-cream cones 14 are advanced by the use of carrier plate strips 18 which, in a manner not shown but well known in the art, hold the cones by means of special holding knives. The apparatus shown comprises means for successive lowering of the carrier plate strips 18, e.g. as in systems for dipping the ice domes in a coating substance. The apparatus box 2 is stationary in the height direction, but as indicated by an arrow the entire unit 16,2 is horizontally displaceable to and from a position beneath a dosing device 20 having a conveyor worm 22 operable to bring the granular drystuff from a non-illustrated supply container out through the length of the dosing device, from which it is brought to fall down into the box 2 for refilling thereof after each operation cycle. It has been found that in this manner it is possible to rapidly achieve a suitable refilling without overfilling and scraping, but this should not be further disclosed in the present connection.

We claim:

1. A method of applying drystuff particles on edible ice domes, comprising the steps of:

pressing down domes against a resiliently depressable support carrying a layer of drystuff particles, said support being a spherical membrane of a size of the same magnitude as the size of the domes;

maintaining a drystuff particle filling in a space around the spherical membrane at a level above a bottom surface surrounding a lower end of the membrane which is up to just above a top of the membrane in a freely upstanding position thereof;

effecting said pressing down of the domes by a relative movement of the domes with respect to the bottom surface, dipping the domes into the particle filling while producing a pressure deformation of the spherical membrane from said freely upstanding position thereof;

effecting a relative pushing up of a local carrier means of the lower end of the membrane relative to the bottom surface, in synchronism with the dipping of the domes, causing an upper edge of the membrane to be maintained underneath a top surface of the particle filling.

2. The method according to claim 1, wherein, during a final dipping phase, a pressure medium is introduced into the space underneath the downwardly depressed membrane.

3. A method according to claim 1, wherein said ice domes project from cones and said drystuff particles are selected from the group consisting of chocolate, fruit and nuts.

4. An apparatus for applying drystuff particles on ice domes projecting from cones, comprising:

an upwardly open box chamber having a bottom plate for receiving a drystuff particle filling;

a spherical and resiliently depressible membrane projecting upwardly from said bottom plate to a level below a top surface of drystuff particle filling within the box chamber;

wherein the membrane is a top portion on a cylindrical cup member; wherein said cylindrical cup member is connected with a means for controlling a vertical displacement of the cup member relative to and through a through-opening in the bottom plate while a holding unit for a dome to be coated is operable to lower the dome for dipping the dome in the particle filling and for depressing the spherical membrane concurrently with a relative raising of the cup member and membrane, causing an upper end of the membrane to act as a cylindrical rolling membrane, a top end plane of the membrane being located beneath a top side level of the particle filling in the box chamber during dipping of the dome.

5. The apparatus according to claim 4, wherein, the bottom plate of the box chamber is held stationary in the vertical direction, while the holding unit and the cup member are vertically movable in counter phase.

6. The apparatus according to claim 4, further comprising means for building up an overpressure in the space at the underside of the membrane.

7. An apparatus according to claim 4, wherein, a row of cup members is arranged in connection with a common drystuff particle box, which, as a whole, is horizontally displaceable into a position underneath a refilling station arranged in parallel with the box.

* * * * *

UNITED STATES PATENT AND TRADEMARK OFFICE
CERTIFICATE OF CORRECTION

PATENT NO.    : 6,033,702                                Page 1 of 1
DATED         : March 7, 2000
INVENTOR(S)   : Ulrik Pedersen and Ole Krener It is certified that error appears in the above-identified patent and that said Letters Patent is hereby corrected as shown below:

<u>Title page,</u>
Item [22], should read:

-- [22]  PCT Filed: February 10, 1997 --

Signed and Sealed this

Eleventh Day of March, 2003

JAMES E. ROGAN
*Director of the United States Patent and Trademark Office*